(12) United States Patent
Leung

(10) Patent No.: US 6,963,918 B1
(45) Date of Patent: Nov. 8, 2005

(54) VOICE OVER IP OPTIMIZATION FOR MOBILE IP

(75) Inventor: Kent K. Leung, Mountain View, CA (US)

(73) Assignee: Cisco Technology, Inc., San Jose, CA (US)

(*) Notice: Subject to any disclaimer, the term of this patent is extended or adjusted under 35 U.S.C. 154(b) by 757 days.

(21) Appl. No.: 09/608,460

(22) Filed: Jun. 29, 2000

(51) Int. Cl.[7] ............................ G06F 15/16; H04Q 7/216
(52) U.S. Cl. ...................... 709/228; 709/238; 709/245; 370/329
(58) Field of Search ............................... 709/227, 228, 709/238–245, 202; 370/329, 331

(56) References Cited

U.S. PATENT DOCUMENTS

| | | |
|---|---|---|
| 4,692,918 A | 9/1987 | Elliott et al. |
| 5,016,244 A | 5/1991 | Massey, Jr. et al. |
| 5,018,133 A | 5/1991 | Tsukakoshi et al. |
| 5,218,600 A | 6/1993 | Schenkyr et al. |
| 5,371,852 A | 12/1994 | Attanasio et al. |
| 5,473,599 A | 12/1995 | Li et al. |
| 5,572,528 A | 11/1996 | Shuen |
| 5,619,552 A | 4/1997 | Karppanen et al. |
| 5,729,537 A | 3/1998 | Billström |
| 5,825,759 A | 10/1998 | Liu |
| 5,862,345 A * | 1/1999 | Okanoue et al. ............ 709/238 |
| 6,061,650 A * | 5/2000 | Malkin et al. ............... 704/228 |
| 6,078,575 A | 6/2000 | Dommety et al. |
| 6,195,705 B1 | 2/2001 | Leung |
| 6,339,830 B1 | 1/2002 | See et al. .................... 713/202 |
| 6,674,734 B1 * | 1/2004 | Hsu et al. .................... 370/331 |
| 6,766,168 B1 * | 7/2004 | Lim .......................... 455/435.1 |
| 2002/0026527 A1 * | 2/2002 | Das et al. ................... 709/245 |
| 2002/0032751 A1 * | 3/2002 | Bharadwaj .................. 709/218 |
| 2002/0058507 A1 * | 5/2002 | Valentine et al. ............ 455/426 |
| 2002/0194259 A1 * | 12/2002 | Flykt et al. .................. 709/239 |
| 2003/0182433 A1 * | 9/2003 | Kulkarni et al. ............. 709/228 |
| 2003/0208568 A1 * | 11/2003 | Inoue et al. ................. 709/220 |

OTHER PUBLICATIONS

Lu, et al, "Toward the PSTN/Internet Inter-Networking-Pre-PINT Implementation," RFC2458, Nov. 1998, pp. 1-60.
Li, et al "Cisco Hot Standby Router Protocol(HSRP)," Mar., 1998, Network Working Group RFC 2281 (http://ftp.ietf.org/rfc/rfc2281.txt?number=2281).

(Continued)

*Primary Examiner*—Patrice Winder
(74) *Attorney, Agent, or Firm*—Beyer Weaver & Thomas LLP

(57) ABSTRACT

An invention is disclosed that includes a Foreign Agent that supports Mobile IP and is configured to enable a node visiting the Foreign Agent to send IP packets including voice information via an IP address obtained from an H.323 gateway. This is accomplished, in part, by sending an agent advertisement identifying an H.323 gateway on the foreign network. A packet is received from the node, where the packet is addressed to the H.323 gateway and requests an IP address associated with a destination. A packet including the requested IP address is forwarded to the node. An IP packet addressed to the IP address and including voice information may then be received from the node. A node visiting the Foreign is capable of sending IP packets including voice information and receives an agent advertisement identifying an H.323 gateway on a foreign network associated with the Foreign Agent. The node sends a packet addressed to the H.323 gateway, where the packet requests an IP address associated with a destination. A packet including the requested IP address is received by the node. The node may then send an IP packet addressed to the IP address and including voice information from the node.

21 Claims, 7 Drawing Sheets

OTHER PUBLICATIONS

Release notes for 3Com Corporation, *"Conducting a Redundant Route for Network Resiliency"*, Mar. 1994, *NET Builder Family Bridge/Router* , pp. 26-29.

J. Moy, *"OSPF Version 2"*, RFC 1247, Jul. 19, 1991.

D. Oran, *"OSI IS-IS Intra-domain Routing Protocol"*, RFC 1142, Feb. 1990.

Uyless Black, *"TCP/IP and Related Protocols"*, 1992, *McGraw-Hill, Inc.*, pp. 226-249.

Chambless, et al., *"Home Agent Redundancy Protocol (HARP )"*, Oct. 27, 1997.

C. Perkins, *"IP Mobility Support"*, Networking Working Group, RFC 2002 Oct. 1996.

* cited by examiner

VOICE OVER IP OPTIMIZATION FOR MOBILE IP

BACKGROUND OF THE INVENTION

1. Field of the Invention

The present invention relates to Mobile IP network technology. More particularly, the present invention relates to optimizing voice over IP in a Mobile IP environment.

2. Description of the Related Art

Mobile IP is a protocol which allows laptop computers or other mobile computer units (referred to as "Mobile Nodes" herein) to roam between various sub-networks at various locations—while maintaining internet and/or WAN connectivity. Without Mobile IP or related protocol, a Mobile Node would be unable to stay connected while roaming through various sub-networks. This is because the IP address required for any node to communicate over the internet is location specific. Each IP address has a field that specifies the particular sub-network on which the node resides. If a user desires to take a computer which is normally attached to one node and roam with it so that it passes through different sub-networks, it cannot use its home base IP address. As a result, a business person traveling across the country cannot merely roam with his or her computer across geographically disparate network segments or wireless nodes while remaining connected over the internet. This is not an acceptable state-of-affairs in the age of portable computational devices.

To address this problem, the Mobile IP protocol has been developed and implemented. An implementation of Mobile IP is described in RFC 2002 of the Network Working Group, C. Perkins, Ed., October 1996. Mobile IP is also described in the text "Mobile IP Unplugged" by J. Solomon, Prentice Hall. Both of these references are incorporated herein by reference in their entireties and for all purposes.

The Mobile IP process and environment are illustrated in FIG. 1. As shown there, a Mobile IP environment 2 includes the internet (or a WAN) 4 over which a Mobile Node 6 can communicate remotely via mediation by a Home Agent 8 and a Foreign Agent 10. Typically, the Home Agent and Foreign Agent are routers or other network connection devices performing appropriate Mobile IP functions as implemented by software, hardware, and/or firmware. A particular Mobile Node (e.g., a laptop computer) plugged into its home network segment connects with the internet through its designated Home Agent. When the Mobile Node roams, it communicates via the internet through an available Foreign Agent. Presumably, there are many Foreign Agents available at geographically disparate locations to allow wide spread internet connection via the Mobile IP protocol. Note that it is also possible for the Mobile Node to register directly with its Home Agent.

As shown in FIG. 1, Mobile Node 6 normally resides on (or is "based at") a network segment 12 which allows its network entities to communicate over the internet 4 through Home Agent 8 (an appropriately configured router denoted R2). Note that Home Agent 8 need not directly connect to the internet. For example, as shown in FIG. 1, it may be connected through another router (a router R1 in this case). Router R1 may, in turn, connect one or more other routers (e.g., a router R3) with the internet.

Now, suppose that Mobile Node 6 is removed from its home base network segment 12 and roams to a remote network segment 14. Network segment 14 may include various other nodes such as a PC 16. The nodes on network segment 14 communicate with the internet through a router which doubles as Foreign Agent 10. Mobile Node 6 may identify Foreign Agent 10 through various solicitations and advertisements which form part of the Mobile IP protocol. When Mobile Node 6 engages with network segment 14, Foreign Agent 10 relays a registration request to Home Agent 8 (as indicated by the dotted line "Registration"). The Home and Foreign Agents may then negotiate the conditions of the Mobile Node's attachment to Foreign Agent 10. For example, the attachment may be limited to a period of time, such as two hours. When the negotiation is successfully completed, Home Agent 8 updates an internal "mobility binding table" which specifies the care-of address (e.g., a collocated care-of address or the Foreign Agent's IP address) in association with the identity of Mobile Node 6. Further, the Foreign Agent 10 updates an internal "visitor table" which specifies the Mobile Node address, Home Agent address, etc. In effect, the Mobile Node's home base IP address (associated with segment 12) has been shifted to the Foreign Agent's IP address (associated with segment 14).

Now, suppose that Mobile Node 6 wishes to send a message to a corresponding node 18 from its new location. An output message from the Mobile Node is then packetized and forwarded through Foreign Agent 10 over the internet 4 and to corresponding node 18 (as indicated by the dotted line "packet from MN") according to a standard internet protocol. If corresponding node 18 wishes to send a message to Mobile Node—whether in reply to a message from the Mobile Node or for any other reason—it addresses that message to the IP address of Mobile Node 6 on sub-network 12. The packets of that message are then forwarded over the internet 4 and to router R1 and ultimately to Home Agent 8 as indicated by the dotted line ("packet to MN(1)"). From its mobility binding table, Home Agent 8 recognizes that Mobile Node 6 is no longer attached to network segment 12. It then encapsulates the packets from corresponding node 18 (which are addressed to Mobile Node 6 on network segment 12) according to a Mobile IP protocol and forwards these encapsulated packets to a "care of" address for Mobile Node 6 as shown by the dotted line ("packet to MN(2)"). The care-of address may be, for example, the IP address of Foreign Agent 10. Foreign Agent 10 then strips the encapsulation and forwards the message to Mobile Node 6 on sub-network 14. The packet forwarding mechanism implemented by the Home and Foreign Agents is often referred to as "tunneling."

Voice over IP (VoIP) is a term used in IP telephony for a set of facilities for managing the delivery of voice information using the Internet Protocol (IP). In general, this means sending voice information in digital form in discrete packets rather than in the traditional circuit-committed protocols of the public switched telephone network (PSTN). A major advantage of VoIP and Internet telephony is that it avoids the tolls charged by ordinary telephone service.

ITU-T H.323 is the current standard for sending voice (audio) and video using IP on the public Internet and within intranets. Using VoIP, an enterprise positions a VoIP device at an H.323 gateway. The H.323 gateway receives packetized voice transmissions from users within the company and then routes them to other parts of its intranet (local or wide area network) or sends them over the PSTN.

An important component of an H.323 enabled network is a gatekeeper. A gatekeeper acts as the central point for all calls within its zone and provides call control services to registered endpoints. Gatekeepers perform two important call control functions. The first is address translation from LAN aliases for terminals and gateways to IP or IPX addresses. The second function is bandwidth function. A gatekeeper is not required in an H.323 system. However, if a gatekeeper is present, terminals must make use of the services offered by gatekeepers. Gatekeeper functionality may be incorporated into the physical implementation of gateways.

An optional, but valuable feature of a gatekeeper is its ability to route H.323 calls. By routing a call through a gatekeeper, it can be controlled more effectively. Service providers need this ability in order to bill for calls placed through their network. This service can also be used to re-route a call to another endpoint if a called endpoint is unavailable. In addition, a gatekeeper capable of routing H.323 calls can help make decisions involving balancing among multiple gateways. For instance, if a call to a particular destination phone number is routed through a gatekeeper, that gatekeeper can then re-route the call to one of many gateways based upon some routing logic. In addition, the gatekeeper typically provides an IP address associated with the appropriate H.323 gateway.

In a Mobile IP environment, when a node roams to a Foreign Agent on a foreign network, calls are often set up through a gatekeeper on the roaming node's home network. This gatekeeper will then select an H.323 gateway to the PSTN that is located on the home network associated with the roaming node's Home Agent. However, it is important to note that the distance between the Home Agent and the Foreign Agent may be substantial. Moreover, voice is particularly sensitive to latency. In view of the above, it would be desirable to improve the routing path in order to optimize voice over IP in a Mobile IP environment.

SUMMARY OF THE INVENTION

The present invention provides methods and apparatus for optimizing voice over IP in a Mobile IP environment. This is accomplished, in part, by using a local H.323 gateway rather than an H.323 gateway on the home network when possible. In this manner, the routing path is minimized thereby reducing latency in the voice traffic.

In accordance with one aspect of the invention, a Foreign Agent that supports Mobile IP is located on a foreign network and configured to enable a node visiting the Foreign Agent to send IP packets including voice information via an IP address obtained from an H.323 gateway. This is accomplished, in part, by sending an agent advertisement identifying an H.323 gateway on the foreign network. A packet is received from the node, where the packet is addressed to the H.323 gateway and requests an IP address associated with a destination. A packet including the requested IP address is forwarded to the node. An IP packet addressed to the IP address and including voice information may then be received from the node.

In accordance with another aspect of the invention, a node visiting a Foreign Agent on a foreign network is capable of sending IP packets including voice information via an IP address obtained from an H.323 gateway. The node receives an agent advertisement identifying an H.323 gateway on the foreign network. The node sends a packet addressed to the H.323 gateway, where the packet requests an IP address associated with a destination. A packet including the requested IP address is received by the node. The node may then send an IP packet addressed to the IP address and including voice information.

DETAILED DESCRIPTION OF THE INVENTION

In the following description, numerous specific details are set forth in order to provide a thorough understanding of the present invention. It will be obvious, however, to one skilled in the art, that the present invention may be practiced without some or all of these specific details. In other instances, well known process steps have not been described in detail in order not to unnecessarily obscure the present invention.

Figure 1:
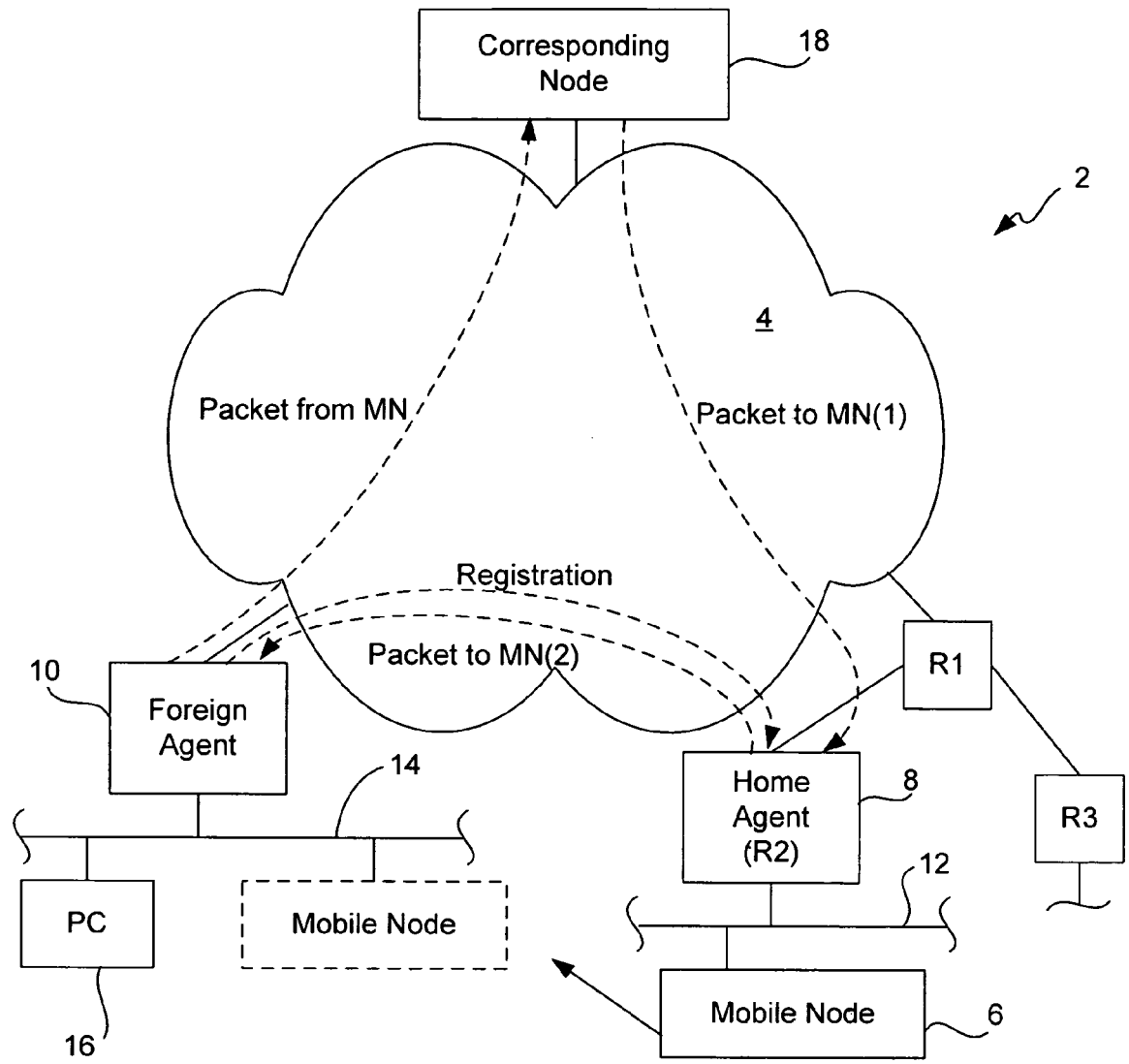
FIG. 1 is a diagram illustrating a Mobile IP network segment and associated environment.
Figure 2:
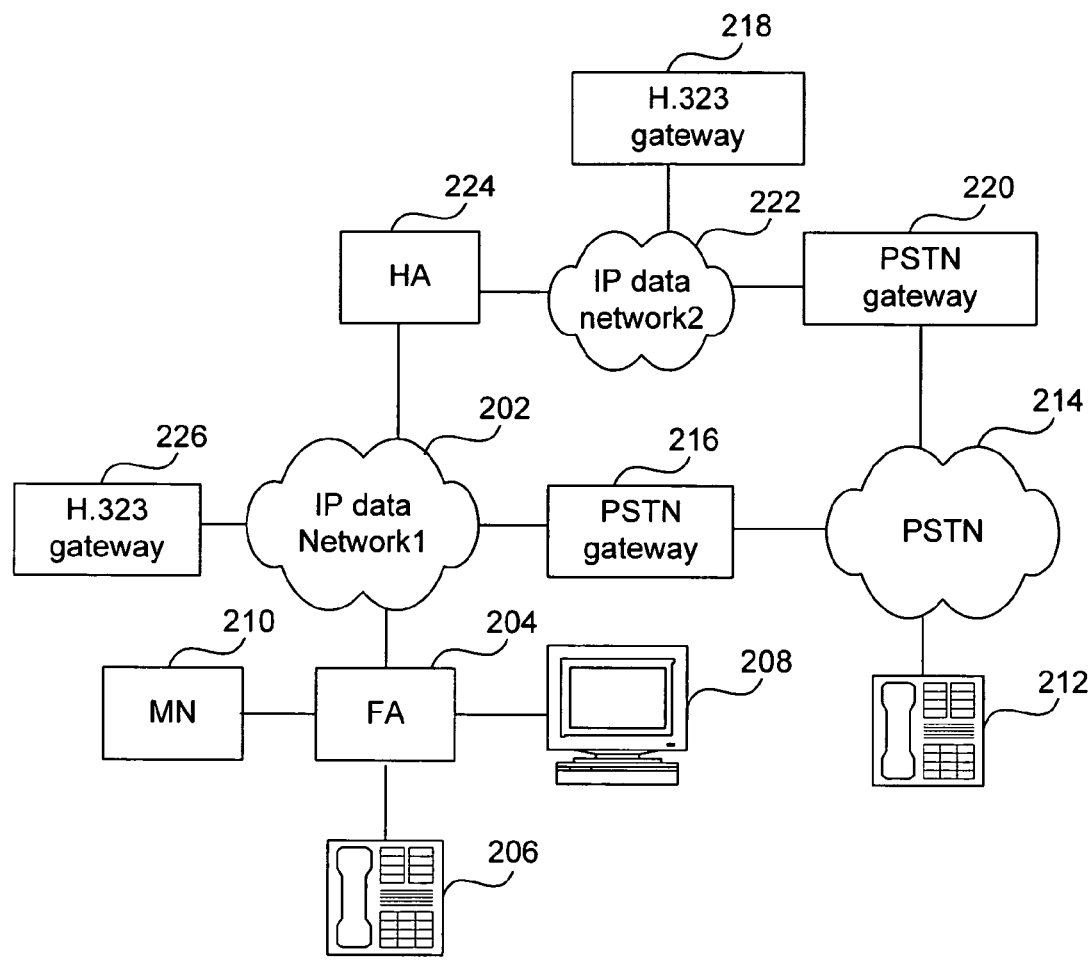
FIG. 2 is a block diagram illustrating a system in which voice over IP may be optimized within a Mobile IP environment in accordance with an embodiment of the invention.

FIG. 2 is a block diagram illustrating a system in which voice over IP may be optimized within a Mobile IP environment in accordance with an embodiment of the invention. When a person wishes to send and/or receive voice over an IP data network 202, the person may connect to the IP data network 202 using a router such as a Foreign Agent 204. Through connecting to this router 204, a person may send and receive voice in IP packets through a phone 206, a personal computer (PC) 208 or a node such as a mobile node 210. In order to send packets to and/or receive packets from phone 212 via PSTN 214, an IP address associated with a particular destination (e.g., phone number) must be obtained. The destination may be a PSTN gateway 216 or another device. In this instance, since the call is being made to the phone 212, the destination of the IP connection is the PSTN gateway 216. Typically, a node such as a mobile node obtains an IP address associated with a destination from an H.323 gateway 218 on the node's home IP data network 222. The H.323 gateway 218 provides an appropriate destination IP address to the Foreign Agent 204. For instance, the H.323 gateway 218 may return the IP address of a PSTN gateway 220 on the home network 222. The Foreign Agent 204 then connects to the PSTN gateway 220 using the obtained IP address. IP data packets including voice information may then be routed to and from the Foreign Agent 204 via Home Agent 224.

In order to optimize voice over IP in a Mobile IP environment, the present invention enables a local H.323 gateway 226 to be discovered by the mobile node 210 initiating the call. In accordance with one embodiment, the Foreign Agent 204 sends an agent advertisement identifying the local H.323 gateway 226 on the foreign IP data network 202. From this agent advertisement, the mobile node 210 may obtain and save H.323 gateway information associated with the local H.323 gateway 226. The mobile node 210 may then send a packet addressed to the local H.323 gateway requesting an IP address associated with a destination. For instance, the destination may be a device or a PSTN gateway. The Foreign Agent 204 then forwards a packet including the requested IP address to the mobile node 210. The IP address is preferably obtained from the local H.323 gateway 226. However, when the IP address cannot be obtained from the local H.323 gateway 226, the IP address may be obtained from the H.323 gateway 218 on the home IP data network 222. Once the mobile node 210 obtains the IP address, the mobile node may address an IP packet including voice information to the obtained IP address and send the IP packet via the obtained destination address.

As described above, the data flow from a mobile node may be optimized through a local H.323 gateway. In addition, data flow may also be optimized on the return path to the mobile node (e.g., from a PSTN gateway). The PSTN gateway typically sends IP packets including voice information to the node via the Home Agent 224, which tunnels the packets to the Foreign Agent 204. The Foreign Agent 204 then forwards these IP data packets to the mobile node 210. Rather than requiring all data packets to be sent via the Home Agent 224, the corresponding node (e.g., PSTN gateway) may be notified by the Home Agent 224, Foreign Agent 204 or mobile node 210 that the mobile node 210 is visiting the Foreign Agent 204. For instance, a packet including the care-of address associated with the Foreign Agent 204 may be sent to the corresponding node (e.g., PSTN gateway 216). The corresponding node may then tunnel packets directly to the care-of address. The Foreign Agent 204 may then forward the IP data packets to the mobile node. In this manner, the transmission of IP data packets via the return data path may similarly be optimized.

Figure 3:
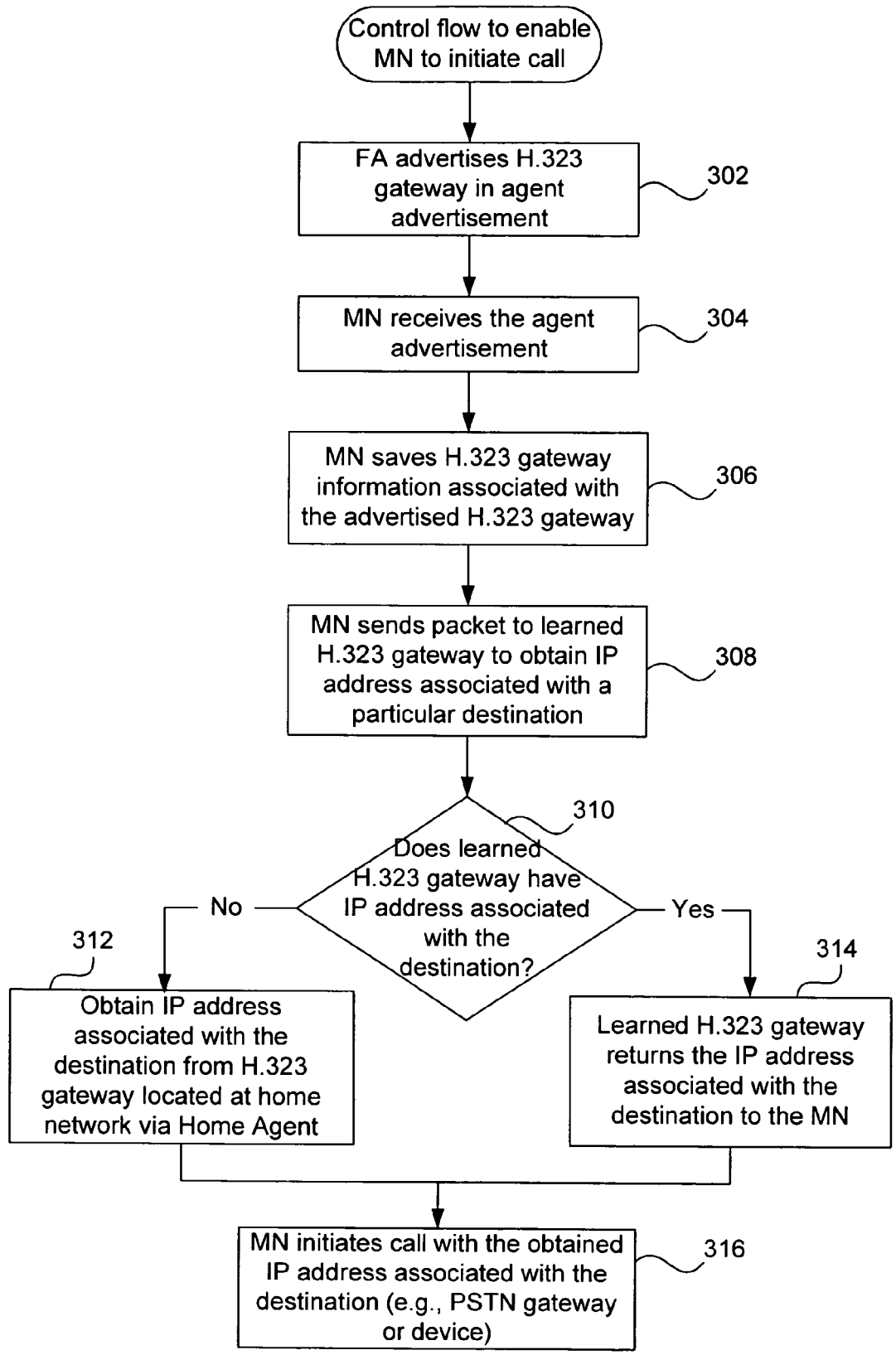
FIG. 3 is a process flow diagram illustrating a control flow enabling a node to initiate a call in accordance with an embodiment of the invention.

FIG. 3 is a process flow diagram illustrating a control flow enabling a node to initiate a call in accordance with an embodiment of the invention. The Foreign Agent advertises a local H.323 gateway on the foreign network by sending an agent advertisement identifying the local H.323 gateway at block 302. The mobile node receives the agent advertisement at block 304. The mobile node may then save H.323 gateway information associated with the advertised H.323 gateway at block 306. The mobile node then sends a packet to the learned H.323 gateway to obtain an IP address associated with a particular destination at block 308. For instance, the destination may be a device or a PSTN gateway where communication with a telephone or other device over the PSTN is desired.

The local H.323 gateway may not have access to the desired IP address. Thus, it is determined at block 310 whether the learned H.323 gateway has access to an IP address associated with the destination. When the local H.323 gateway does not have access to the desired destination IP address, the IP address may be obtained at block 312 from a second H.323 gateway located at the home network via the Home Agent. Alternatively, when the local H.323 gateway has access to the destination IP address, the local H.323 gateway returns the IP address associated with the destination to the mobile node at block 314. The mobile node then initiates a call with the obtained IP address at block 316. The Foreign Agent then sends IP data packets addressed to the obtained IP address to the IP address.

Figure 4:
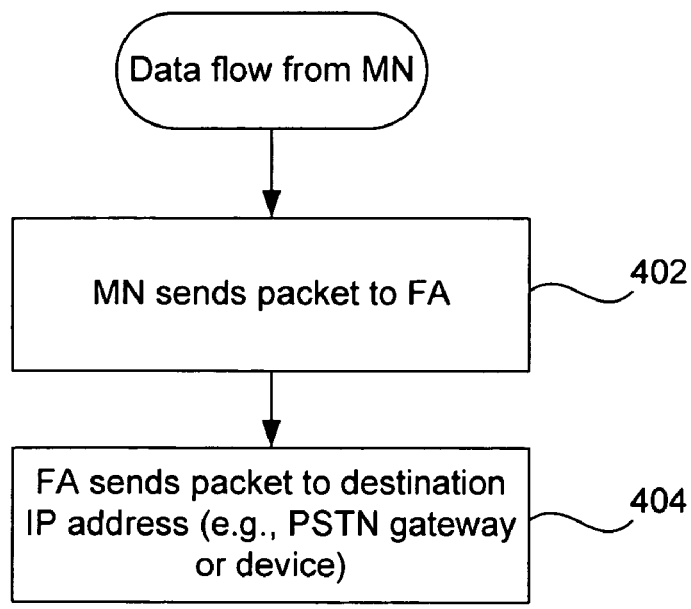
FIG. 4 is a process flow diagram illustrating a data flow from a node in accordance with an embodiment of the invention.

Once a call is initiated, IP packets including voice information may be sent by the node to its specified destination. FIG. 4 is a process flow diagram illustrating a data flow from a node in accordance with an embodiment of the invention. As described above, once the IP address is obtained, the mobile node may send an IP packet to the IP address. Thus, the mobile node sends an IP packet including voice information to the Foreign Agent at block 402. The Foreign Agent then sends the IP packet to the IP address at block 404. For instance, the IP address may identify a PSTN gateway or other device.

Figure 5:
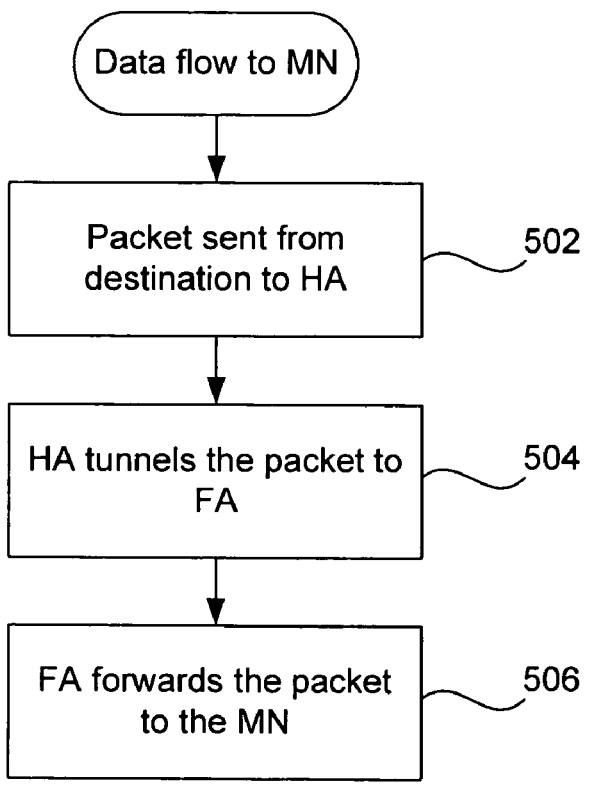
FIG. 5 is a process flow diagram illustrating a return data flow path to the node in accordance with a first embodiment of the invention.

Once a call is initiated, IP data packets may be sent to the mobile node. FIG. 5 is a process flow diagram illustrating a return data flow path to the node in accordance with a first embodiment of the invention. As shown, at block 502 a packet is sent from the destination to the Home Agent. The Home Agent then tunnels the packet to the Foreign Agent at block 504. The Foreign Agent then forwards the packet to the mobile node at block 506.

Figure 6:
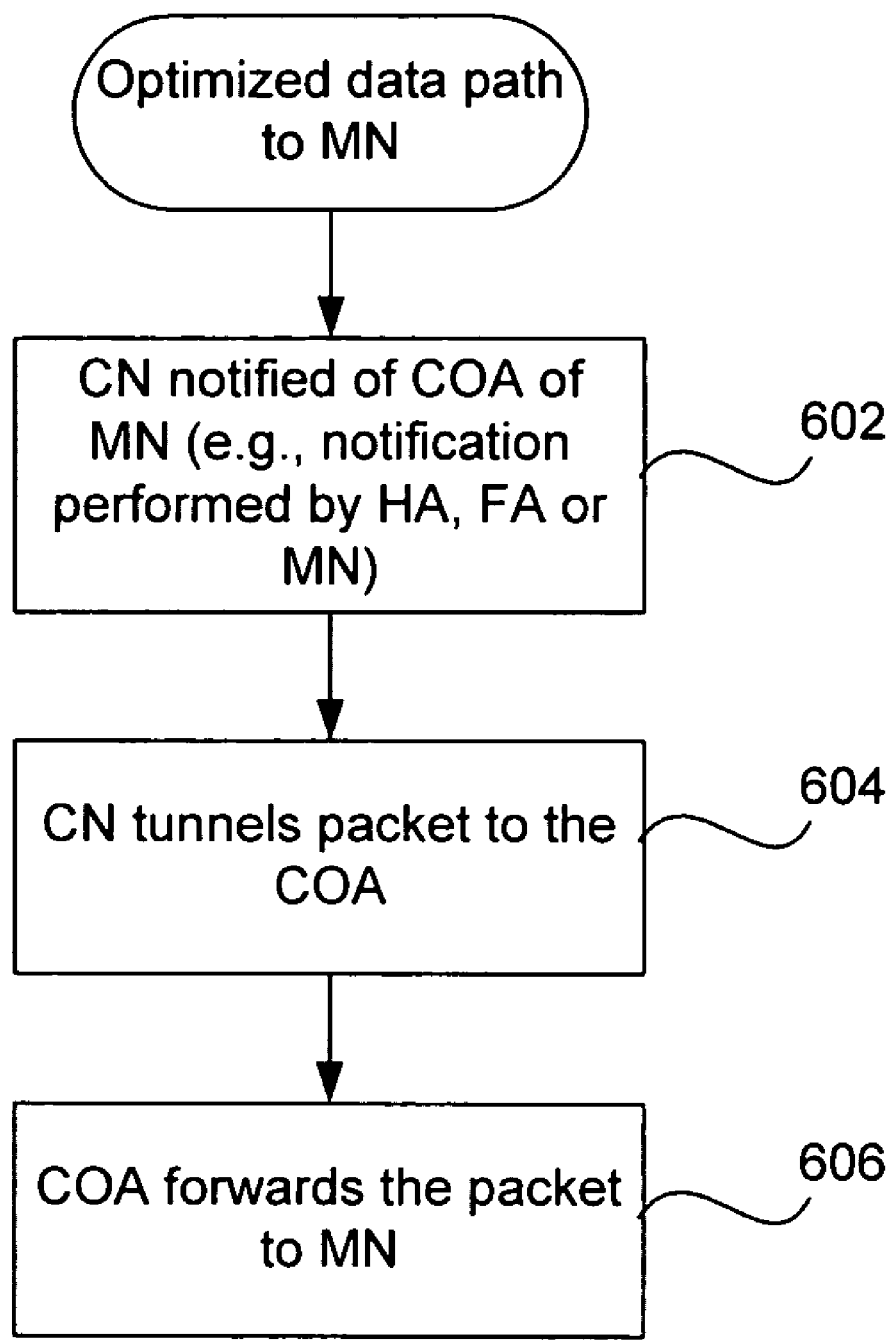
FIG. 6 is a process flow diagram illustrating a return data flow path to the node that is optimized in accordance with a second embodiment of the invention.

While the method shown and described with reference to FIG. 5 enables IP data packets to be received by a roaming node, this method is not the optimum. FIG. 6 is a process flow diagram illustrating a return data flow path to the node that is optimized in accordance with a second embodiment of the invention. More particularly, the corresponding node with which the mobile node is communicating (e.g., PSTN gateway or other device) is notified of the care-of address of the mobile node at block 602. Each PSTN gateway preferably supports Mobile IP so that it may receive a mobile IP packet including the current care-of address of the mobile node. The corresponding node then tunnels IP data packets to the care-of address at block 604. The Foreign Agent identified by the care-of address then forwards the IP data packets to the mobile node at block 606.

Figure 7:
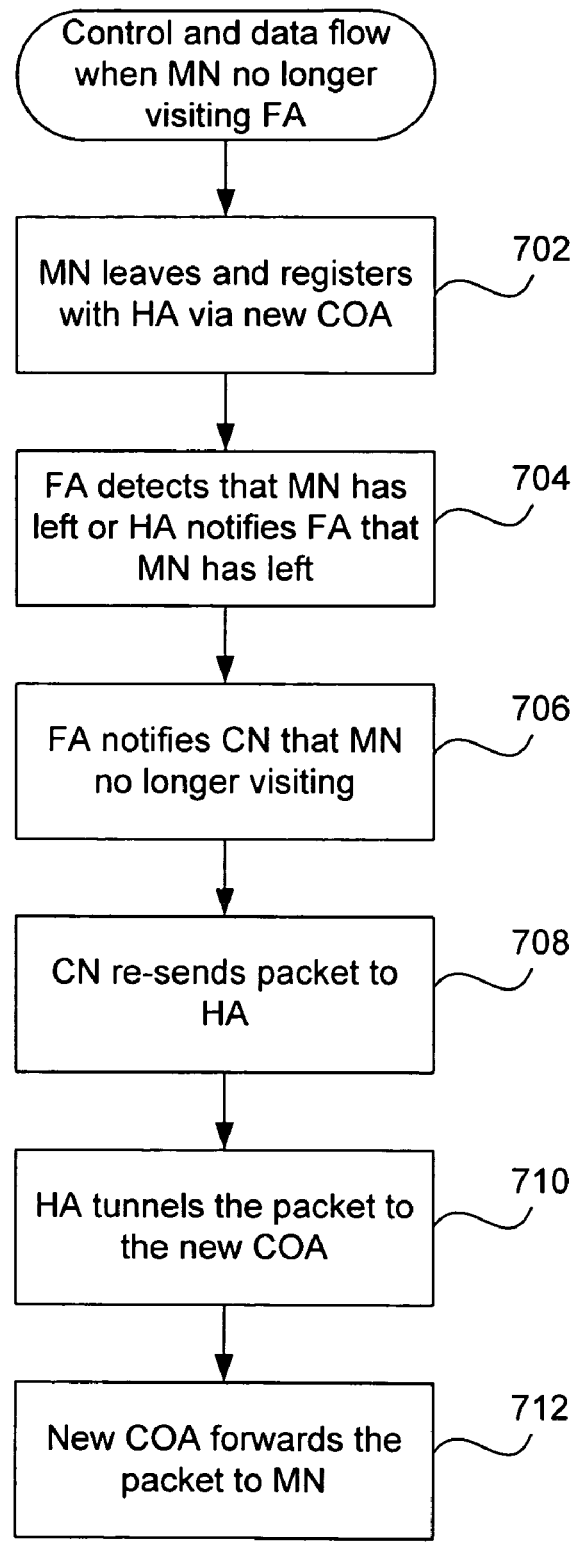
FIG. 7 is a process flow diagram illustrating a control and data flow that enables packets to be received by a node when the node is no longer visiting the Foreign Agent in accordance with an embodiment of the invention.

When the mobile node roams to a new Foreign Agent, the mobile node will be unable to receive IP packets via the old Foreign Agent. FIG. 7 is a process flow diagram illustrating a control and data flow that enables packets to be received by a node when the node is no longer visiting the Foreign Agent in accordance with an embodiment of the invention. When the mobile node leaves, it registers with its Home Agent via a new care-of address associated with a new Foreign Agent at block 702. The old Foreign Agent then detects that the mobile node is no longer visiting the old Foreign Agent or, alternatively, the Home Agent notifies the old Foreign Agent that the mobile node has left at block 704. As described above with reference to FIG. 6, the corresponding node may correspond directly with the Foreign Agent. Moreover, the mobile node may not necessarily de-register with the Home Agent when it roams to the new Foreign Agent. Thus, since the Home Agent may not be aware of whether the corresponding node and the mobile node are still communicating, the Foreign Agent notifies the corresponding node that the mobile node is no longer visiting at block 706. The corresponding node then re-sends the packet to the Home Agent at block 708. The Home Agent tunnels the packet to the new care-of address at block 710. The new Foreign Agent identified by the new care-of address then forwards the packet to the mobile node at block 712.

The present invention provides a mechanism for discovery of a local H.323 gateway that is located on a foreign network. Through this discovery mechanism, a node that is roaming may send IP data packets including voice information via a shortened route via this local H.323 gateway. In this manner, voice over IP is optimized in a Mobile IP environment.

The invention can also be embodied as computer readable code on a computer readable medium. The computer readable medium is any data storage device that can store data which can thereafter be read by a computer system.

Examples of the computer readable medium include read-only memory, random-access memory, CD-ROMs, magnetic tape, and optical data storage devices.

The apparatus (Home Agent, Foreign Agent, multicast router and/or node) of this invention may be specially constructed for the required purposes, or may be a general purpose programmable machine selectively activated or reconfigured by a computer program stored in memory. The processes presented herein are not inherently related to any particular router or other apparatus. In a preferred embodiment, any of the Home and Foreign Agents of this invention may be specially configured routers such as specially configured router models 2500, 2600, 3600, 4000, 4500, 4700, 7200, and 7500 available from Cisco Systems, Inc. of San Jose, Calif. A general structure for some of these machines will appear from the description given below.

Generally, the present invention may be implemented on software and/or hardware. For example, it can be implemented in an operating system kernel, in a separate user process, in a library package bound into network applications, on a specially constructed machine, or on a network interface card. In a specific embodiment of this invention, the technique of the present invention is implemented in software such as an operating system or in an application running on an operating system.

A software or software/hardware hybrid registration system of this invention is preferably implemented on a general-purpose programmable machine selectively activated or reconfigured by a computer program stored in memory. Such programmable machine may be a network device designed to handle network traffic. Such network devices typically have multiple network interfaces including frame relay and ISDN interfaces, for example. Specific examples of such network devices include routers and switches. For example, the routers of the present invention may be specially configured routers such as specially configured router models 1600, 2500, 2600, 3600, 4500, 4700, 7200, 7500, and 12000 available from Cisco Systems, Inc. of San Jose, Calif. A general architecture for some of these machines will appear from the description given below. In an alternative embodiment, the present invention may be implemented on a general-purpose network host machine such as a personal computer or workstation. Further, the invention may be at least partially implemented on a card (e.g., an interface card) for a network device or a general-purpose computing device.

Figure 8:
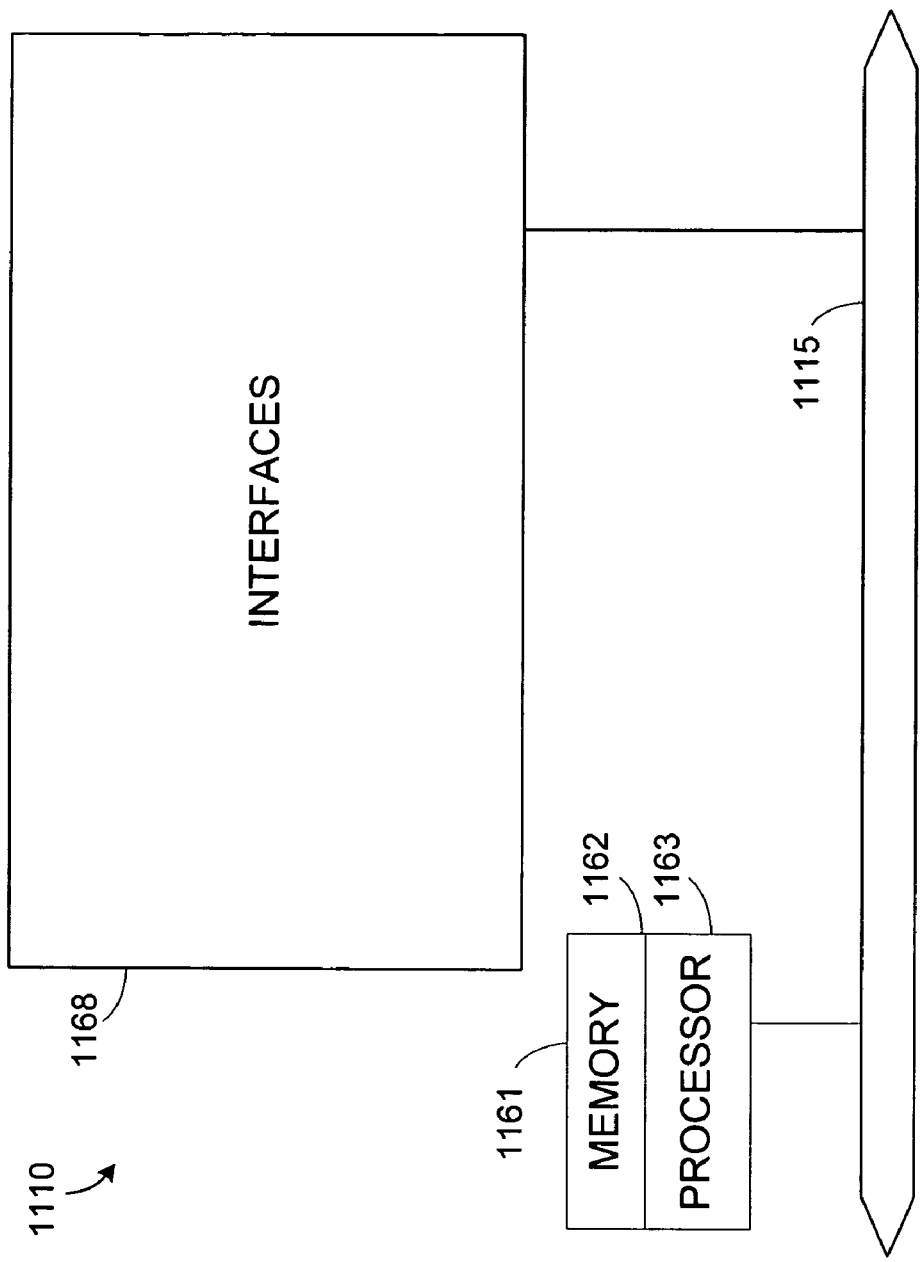
FIG. 8 is a block diagram of a network device that may be configured to implement aspects of the present invention.

Referring now to FIG. 8, a router 1110 suitable for implementing the present invention includes a master central processing unit (CPU) 1162, interfaces 1168, and a bus 1115 (e.g., a PCI bus). When acting under the control of appropriate software or firmware, the CPU 1162 is responsible for such router tasks as routing table computations and network management. It may also be responsible for updating mobility binding and visitor tables, etc. It preferably accomplishes all these functions under the control of software including an operating system (e.g., the Internetwork Operating System (IOS®) of Cisco Systems, Inc.) and any appropriate applications software. CPU 1162 may include one or more processors 1163 such as a processor from the Motorola family of microprocessors or the MIPS family of microprocessors. In an alternative embodiment, processor 1163 is specially designed hardware for controlling the operations of router 1110. In a specific embodiment, a memory 1161 (such as non-volatile RAM and/or ROM) also forms part of CPU 1162. However, there are many different ways in which memory could be coupled to the system.

The interfaces 1168 are typically provided as interface cards (sometimes referred to as "line cards"). Generally, they control the sending and receiving of data packets over the network and sometimes support other peripherals used with the router 1110. Among the interfaces that may be provided are Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 1162 to efficiently perform routing computations, network diagnostics, security functions, etc.

Although the system shown in FIG. 8 is one specific router of the present invention, it is by no means the only router architecture on which the present invention can be implemented. For example, an architecture having a single processor that handles communications as well as routing computations, etc. is often used. Further, other types of interfaces and media could also be used with the router.

Regardless of network device's configuration, it may employ one or more memories or memory modules (including memory 1161) configured to store program instructions for the general-purpose network operations and mechanisms for registration and routing functions described herein. The program instructions may control the operation of an operating system and/or one or more applications, for example. The memory or memories may also be configured to store tables such as mobility binding and visitor tables, etc.

Because such information and program instructions may be employed to implement the systems/methods described herein, the present invention relates to machine readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). The invention may also be embodied in a carrier wave travelling over an appropriate medium such as airwaves, optical lines, electric lines, etc. Examples of program instructions include both machine code, such as produced by a compiler, and files containing higher level code that may be executed by the computer using an interpreter.

Although illustrative embodiments and applications of this invention are shown and described herein, many variations and modifications are possible which remain within the concept, scope, and spirit of the invention, and these variations would become clear to those of ordinary skill in the art after perusal of this application. For instance, although the specification has described routers, other entities used to tunnel packets to mobile nodes on remote network segments can be used as well. For example, bridges or other less intelligent packet switches may also employ the standby protocol of this invention. Moreover, although the node is described as a mobile node, the node may also be a node that does not support Mobile IP. For instance, the Foreign Agent may perform proxy registration on behalf of the node by sending a registration request packet to the Home Agent and processing a registration reply packet received from the Home Agent. Accordingly, the present embodiments are to be considered as illustrative and not restrictive, and the invention is not to be limited to the details given herein, but may be modified within the scope and equivalents of the appended claims.

What is claimed is:

1. A Foreign Agent that supports Mobile IP, the Foreign Agent being on a foreign network and configured to enable a mobile node that supports Mobile IP visiting the Foreign Agent to send IP packets including voice information via an IP address obtained from an H.323 gateway, the Foreign Agent comprising:
   a processor; and
   a memory, the memory storing therein the following instructions:
   instructions for sending an agent advertisement, the agent advertisement identifying an H.323 gateway on the foreign network;
   instructions for receiving a packet from the mobile node, the packet being addressed to the H.323 gateway on the foreign network and requesting an IP address associated with a destination;
   instructions for forwarding a packet including the requested IP address to the mobile node; and
   instructions for receiving an IP packet including voice information from the mobile node, the IP packet being addressed to the IP address.

2. The Foreign Agent as recited in claim 1, further comprising:
   instructions for receiving the packet including the requested IP address from the H.323 gateway.

3. The Foreign Agent as recited in claim 1, further comprising:
   instructions for determining whether the H.323 gateway has access to the requested IP address associated with the destination;
   instructions for obtaining the requested IP address from the H.323 gateway when the H.323 gateway does have access to the requested IP address associated with the destination; and
   instructions for obtaining the requested IP address from a second H.323 gateway located at a home network of the mobile node when the H.323 gateway does not have access to the requested IP address associated with the destination.

4. The Foreign Agent as recited in claim 3, wherein the instructions for obtaining the requested IP address from a second H.323 gateway located at a home network of the mobile node comprise:
   instructions for sending a request for the requested IP address to the Home Agent; and
   instructions for receiving the requested IP address from the Home Agent.

5. The Foreign Agent as recited in claim 1, further comprising:
   instructions for sending the IP packet addressed to the IP address to the IP address.

6. The Foreign Agent as recited in claim 1, wherein the IP address is associated with a PSTN gateway.

7. The Foreign Agent as recited in claim 1, further comprising:
   instructions for sending a registration request to a Home Agent associated with the mobile node;
   instructions for receiving a registration reply from the Home Agent associated with the mobile node; and
   instructions for forwarding the registration reply to the mobile node.

8. The Foreign Agent as recited in claim 7, further comprising:
   instructions for receiving an IP packet including voice information from the Home Agent, the IP packet being addressed to the mobile node; and
   instructions for forwarding the IP packet to the mobile node.

9. The Foreign Agent as recited in claim 1, further comprising:
   instructions for notifying a corresponding node having the IP address that the mobile node is visiting the Foreign Agent.

10. The Foreign Agent as recited in claim 1, further comprising:
    instructions for notifying a corresponding node having the IP address that a care-of address of the mobile node is an address of the Foreign Agent.

11. The Foreign Agent as recited in claim 10, wherein the corresponding node is a PSTN gateway.

12. The Foreign Agent as recited in claim 11, wherein the PSTN gateway supports Mobile IP and wherein notifying the corresponding node having the IP address that the care-of address of the mobile node is an address of the Foreign Agent comprises sending a mobile IP packet including the care-of address to the PSTN gateway.

13. The Foreign Agent as recited in claim 1, further comprising:
    instructions for notifying a corresponding node having the IP address that the mobile node is no longer visiting the Foreign Agent.

14. A mobile node visiting a Foreign Agent on a foreign network and being capable of sending IP packets including voice information via an IP address obtained from an H.323 gateway, the mobile node comprising:
    a processor; and
    a memory storing therein the following instructions:
    instructions for receiving an agent advertisement, the agent advertisement identifying an H.323 gateway on the foreign network;
    instructions for sending a packet from the mobile node, the packet being addressed to the H.323 gateway on the foreign network and requesting an IP address associated with a destination;
    instructions for receiving a packet including the requested IP address; and
    instructions for sending an IP packet including voice information from the mobile node, the IP packet being addressed to the IP address.

15. The mobile node as recited in claim 14, further comprising:
    instructions for saving H.323 gateway information associated with the H.323 gateway.

16. A Foreign Agent that supports Mobile IP, the Foreign Agent being on a foreign network and configured to enable a mobile node visiting the Foreign Agent to send IP packets including voice information via an IP address obtained from an H.323 gateway, the Foreign Agent comprising:
    means for sending an agent advertisement, the agent advertisement identifying an H.323 gateway on the foreign network;
    means for receiving a packet from the mobile node, the packet being addressed to the H.323 gateway on the foreign network and requesting an IP address associated with a destination;

means for forwarding a packet including the requested IP address to the mobile node; and means for receiving an IP packet including voice information from the mobile node, the IP packet being addressed to the IP address.

17. A mobile node visiting a Foreign Agent on a foreign network and being capable of sending IP packets including voice information via an IP address obtained from an H.323 gateway, the mobile node comprising:

means for receiving an agent advertisement, the agent advertisement identifying an H.323 gateway on the foreign network;

means for sending a packet from the mobile node, the packet being addressed to the H.323 gateway on the foreign network and requesting an IP address associated with a destination;

means for receiving a packet including the requested IP address; and means for sending an IP packet including voice information from the mobile node, the IP packet being addressed to the IP address.

18. A computer readable medium for enabling a mobile node visiting a Foreign Agent to send IP packets including voice information via an IP address obtained from an H.323 gateway, the Foreign Agent being on a foreign network, comprising:

instructions for sending an agent advertisement, the agent advertisement identifying an H.323 gateway on the foreign network;

instructions for receiving a packet from the mobile node, the packet being addressed to the H.323 gateway on the foreign network and requesting an IP address associated with a destination;

instructions for forwarding a packet including the requested IP address to the mobile node; and instructions for receiving an IP packet including voice information from the mobile node, the IP packet being addressed to the IP address.

19. A computer-readable medium for enabling a mobile node visiting a Foreign Agent to send IP packets including voice information via an IP address obtained from an H.323 gateway, the Foreign Agent being on a foreign network, comprising:

instructions for receiving an agent advertisement, the agent advertisement identifying an H.323 gateway on the foreign network;

instructions for sending a packet from the mobile node, the packet being addressed to the H.323 gateway on the foreign network and requesting an IP address associated with a destination;

instructions for receiving a packet including the requested IP address; and instructions for sending an IP packet including voice information from the mobile node, the IP packet being addressed to the IP address.

20. In a Foreign Agent that supports Mobile IP, a method of enabling a mobile node visiting the Foreign Agent to send IP packets including voice information via an IP address obtained from an H.323 gateway, the Foreign Agent being on a foreign network, the method comprising:

sending an agent advertisement, the agent advertisement identifying an H.323 gateway on the foreign network;

receiving a packet from the mobile node, the packet being addressed to the H.323 gateway on the foreign network and requesting an IP address associated with a destination;

forwarding a packet including the requested IP address to the mobile node; and receiving an IP packet including voice information from the mobile node, the IP-packet being addressed to the IP address.

21. In a mobile node visiting a Foreign Agent on a foreign network, a method of sending IP packets including voice information via an IP address obtained from an H.323 gateway, the method comprising:

receiving an agent advertisement, the agent advertisement identifying an H.323 gateway on the foreign network;

sending a packet from the mobile node, the packet being addressed to the H.323 gateway on the foreign network and requesting an IP address associated with a destination;

receiving a packet including the requested IP address; and sending an IP packet including voice information from the mobile node, the IP packet being addressed to the IP address.

\* \* \* \* \*